United States Patent [19]

Kostinko

[11] 4,330,518
[45] May 18, 1982

[54] REMOVAL OF CONTAMINANTS FROM ZEOLITE MOTHER LIQUORS

[75] Inventor: John A. Kostinko, Bel Air, Md.

[73] Assignee: J. M. Huber Corporation, Locust, N.J.

[21] Appl. No.: 187,652

[22] Filed: Sep. 16, 1980

Related U.S. Application Data

[63] Continuation-in-part of Ser. No. 88,243, Oct. 25, 1979, abandoned, which is a continuation-in-part of Ser. No. 971,584, Dec. 20, 1978, Pat. No. 4,235,856.

[51] Int. Cl.³ .............................................. C01B 33/28
[52] U.S. Cl. ..................................... 423/329; 423/328
[58] Field of Search ............................... 423/327–330; 252/455 Z

[56] References Cited

U.S. PATENT DOCUMENTS 2,882,243  4/1959  Milton ................................ 423/328
3,058,805 10/1962  Weber ................................ 423/329
4,041,135  8/1977  Williams ............................ 423/329
4,235,856 11/1980  Kostinko ........................... 423/329
4,289,629  9/1981  Andrews .......................... 423/328 X

OTHER PUBLICATIONS

Barrer et al., "J. Chem. Soc.", 1952, pp. 1561–1571.
Breck, "Zeolite Molecular Sieves", 1974, pp. 269–272.

Primary Examiner—Edward J. Meros
Attorney, Agent, or Firm—Ernest A. Schaal; Robert L. Price; Harold H. Flanders

[57] ABSTRACT

The contaminants level of a mother liquor can be reduced in the process of forming solutions of sodium aluminate and sodium silicate, adding together the two solutions to produce a reaction mixture comprising a mother liquor and an amorphous sodium aluminosilicate, reacting the reaction mixture to form a zeolite composition containing zeolite A, recovering the zeolite and recycling the mother liquor. This can be done by heating the zeolite A in the reaction mixture to produce a sodalite type product and recovering that sodalite type product as part of the zeolite composition.

1 Claim, No Drawings

REMOVAL OF CONTAMINANTS FROM ZEOLITE MOTHER LIQUORS

CROSS-REFERENCE TO RELATED APPLICATIONS

This application is a continuation-in-part of copending U.S. application Ser. No. 88,243 filed Oct. 25, 1979, now abandoned which is a continuation-in-part of U.S. application Ser. No. 971,584 filed on Dec. 20, 1978, now U.S. Pat. No. 4,235,856.

BACKGROUND OF THE INVENTION

In general, the present invention relates to the removal of contaminants from mother liquors. More specifically, it relates to the removal of chloride and carbonate contaminants from mother liquors in a zeolite process.

Zeolites can be produced by forming sodium aluminate and sodium silicate solutions, adding together the two solutions to produce a reaction mixture comprising a mother liquor and an amorphous sodium aluminosilicate, reacting the reaction mixture to form a zeolite composition, recovering the zeolite composition from the reaction mixture, and recycling the mother liquor to the reaction mixture.

Before the mother liquor can be recycled, it must be treated to remove halide impurities, organic discoloring complexes, and ferruginous sludge. These impurities need to be removed because the commercial grade raw materials are typically produced in processes which give rise to halide (usually chloride) and carbonate contamination of the raw materials. Unless these impurities are removed, they will accumulate in the recycle stream and reach levels where they cause undesired reactions to occur.

These impurities can be removed by membrane-type cells, fractional crystallization, or similar units. They can also be removed by drawing off some of the recycle stream to a waste dump, but this wastes useful process liquids.

In U.S. patent application Ser. No. 168,833 filed July 10, 1980 by Claude Andrews, now U.S. Pat. No. 4,289,629, chloride and carbonate ion concentrations of a strongly alkaline solution can be reduced by the process of mixing sodium aluminosilicate into the solution, heating the resulting solution to a temperature of at least 90 degrees Celsius to form a sodalite type product, and filtering the sodalite type product from the solution.

SUMMARY OF THE INVENTION

Accordingly, it is an object of this invention to provide a new and highly effective method which overcomes the deficiencies of the prior art.

Another object of this invention is to reduce the cost of removing contaminants from zeolite mother liquors.

A further object of this invention is to reduce the energy needed to remove contaminants from zeolite mother liquors.

Other objects and a fuller understanding of the invention may be had by referring to the following description and claims.

The present invention overcomes the deficiencies of the prior art and achieves its objectives by heating zeolite A produced in a reaction mixture to produce a sodalite type product which reduces the chloride and carbonate ion levels in the mixture. The sodalite type product is recovered from the reaction mixture as part of the zeolite. These zeolites are useful as ion exchange materials in water softening compositions and detergents; as a filler in paper, rubber and plastics; and as a non-settling flatting pigment. Any zeolite process can be so treated as long as the zeolite reaction mixture contains zeolite A.

The amount of sodalite type product produced can be controlled by adjusting reaction temperature, reaction time, water to sodium oxide molar ratio, sodium oxide to silica molar ratio, silica to alumina molar ratio, and any combination thereof. The amount of sodalite type product produced will increase as either the reaction temperature, the reaction time to convert the zeolite A to hydroxysodalite, or the sodium oxide to silica molar ratio is increased, or as either water to sodium oxide molar ratio is decreased or as the silica to alumina molar ratio approaches 2:1. As the amount of sodalite type product increases, more contaminants are removed from the mother liquor. The preferred way of controlling the amount of sodalite type product formed is by reaction time or reaction temperature since they do not require any changes in batch chemistry. If a change in batch chemistry is convenient, then a change in water to sodium oxide molar ratio is most desirable.

In one embodiment, the present invention achieves its objectives by forming a sodium aluminate solution, forming a sodium silicate solution, adding together the sodium aluminate solution and the sodium silicate solution to form a reaction mixture comprising a mother liquor and an amorphous sodium aluminosilicate pigment having a certain composition, heating the mixture, preferably to a temperature of from 60 to 120 degrees Celsius, reacting the mixture, preferably at a temperature of from 60 to 120 degrees Celsius, until a zeolite containing zeolite A is formed, reacting the zeolite A to produce a sodalite type product which reduces the chloride and carbonate ion levels in the mother liquor, then recovering the zeolite and sodalite type product from the reaction mixture and recycling the mother liquor to the reaction mixture. Both the sodium aluminate solution and the sodium silicate solution are preferably heated to a temperature of between 60 and 120 degrees Celsius prior to the addition of the sodium aluminate and the sodium silicate. Preferably the sodium silicate solution has a silica to sodium oxide molar ratio of about 2.4:1. Preferably the sodium aluminate solution is added to the sodium silicate solution so that all of the sodium aluminate solution is added within 30 seconds.

A novel zeolite A is formed when the reaction mixture has a water to sodium oxide molar ratio of between 10:1 and 35:1, preferably between 15:1 and 20:1, most preferably about 20:1, a sodium oxide to silica molar ratio of between 1:1 and 4:1, preferably between 1:1 and 2.5:1, more preferably between 1.5:1 and 2:1, most preferably about 2:1; and a silica to alumina molar ratio of between 2:1 and 10:1, preferably between 3:1 and 10:1, more preferably between 3:1 and 8:1, most preferably about 3:1. When the sodium oxide to silica molar ratio is less than 4:3, the silica to alumina molar ratio is at least 3:1. When the sodium oxide to silica molar ratio is at least 4:3, the sodium oxide to alumina molar ratio is at least 4:1.

A combination of from 20 to 80% zeolite X and from 20 to 80% zeolite A is formed when the reaction mixture has a water to sodium oxide molar ratio of between 10:1 and 60:1, preferably between 20:1 and 50:1, more preferably between 25:1 and 35:1, most preferably about 30:1; a sodium oxide to silica molar ratio of between 0.5:1 and 3:1, preferably between 1.4:1 and 3:1, more preferably between 1.6:1 and 2:1, most preferably about 1.7:1; and a silica to alumina molar ratio of between 2:1 and 15:1, preferably between 2:1 and 10:1, more preferably between 2:1 and 8:1, most preferably about 5.3:1.

In another embodiment, the present invention achieves its objectives by dissolving sand in a sodium hydroxide solution at a pressure of at least 100 psig heated to a temperature of at least 130 degrees Celsius to produce a sodium silicate solution having a silica to sodium oxide molar ratio of between 2.4:1 and 2.8:1, activating the sodium silicate thus formed with alumina, forming a sodium aluminate solution, adding the sodium aluminate solution to the sodium silicate solution so that all of the sodium aluminate solution is added within 30 seconds to form a reaction mixture comprising a mother liquor and an amorphous sodium aluminosilicate pigment having, in total, a certain composition, heating the mixture to a temperature of from 60 to 120 degrees Celsius, reacting the mixture at a temperature of from 60 to 120 degrees Celsius until zeolite containing zeolite A is formed, reacting the zeolite A to produce a sodalite type product which reduces the chloride and carbonate ion levels in the mother liquor, then recovering the zeolite and sodalite type product produced and recycling the mother liquor to the reaction mixture. Preferably the sand is dissolved at a pressure of about 140 psig at a temperature of at least 130 degrees Celsius. Preferably the sodium silicate solution has a silica to sodium oxide molar ratio of about 2.4:1. The sodium silicate is activated with from 50 to 2000 ppm alumina at a temperature of from 15 to 100 degrees Celsius for at least 10 minutes, preferably with from 400 to 600 ppm alumina at room temperature, most preferably with about 600 ppm alumina. Both the sodium silicate solution and the sodium aluminate solution are heated to a temperature of between 60 and 120 degrees Celsius prior to the addition of the sodium aluminate to the sodium silicate. The reaction mixture is reacted at a temperature of from 60 to 120 degrees Celsius until a zeolite is formed.

A novel zeolite A is formed when the reaction mixture has a water to sodium oxide molar ratio of between 25:1 and 35:1, preferably about 25:1; a sodium oxide to silica molar ratio of between 1.4:1 and 2:1, preferably about 1.8:1; and a silica to alumina molar ratio of between 3:1 and 7:1, preferably about 3:1.

A combination of from 20 to 80% zeolite X and from 20 to 80% zeolite A is formed when the reaction mixture has a water to sodium oxide molar ratio of between 10:1 and 60:1, preferably between 15:1 and 60:1, more preferably about 25:1; a sodium oxide to silica molar ratio of between 0.5:1 and 2.5:1, preferably between 0.7:1 and 1.7:1, more preferably about 1.7:1; and a silica to alumina molar ratio of between 5:1 and 15:1, preferably between 5:1 and 10:1, more preferably about 7:1.

DESCRIPTION OF THE PREFERRED EMBODIMENTS

In its broadest aspect, the present invention involves an improvement over the Claude Andrews process described above. In the Andrews process, sodium aluminosilicate is mixed into a mother liquor after the zeolite has been removed from the reaction mixture, then that sodium aluminosilicate is converted into a sodalite type product which reduces contaminants in the mother liquor. In the present invention, some zeolite A is produced in the reaction mixture by adjusting the reactor conditions, then some of that zeolite A is converted into a sodalite type product before the zeolite has been removed from the reaction mixture. The present invention reduces the cost and energy requirements by eliminating a mixing step and the need for an outside source of sodium aluminosilicate. In the Andrews process, zeolite A produced in the reaction mixture can be recycled to the mother liquor as a source of sodium aluminosilicate, but the present invention eliminates the need to separate and recycle the sodium aluminosilicate.

In the known processes for forming zeolites, a reaction mixture of sodium-aluminum-silicate water is prepared having a particular composition. This mixture is maintained at a certain temperature until crystals are formed, then the crystals are separated from the reaction mixture. For silica to alumina molar ratios greater than two, the reaction mixture consists of a sodium silicate mother liquor and an amorphous sodium alumino silicate pigment. When this two phase reaction mixture is reacted at elevated temperatures, nothing visually happens for a certain period of time, but after that period of time the zeolite rapidly crystallizes and can then be separated from the reaction mixture.

CONTROL OF REACTION TIME

The present invention is based in part upon the discovery that, for any particular source of silica, the type of zeolite formed is determined by the reaction time necessary for the beginning of crystallization to occur at a given reaction temperature. When the reaction time is short, hydroxy-sodalite is formed, but when the reaction time is longer, zeolite A is formed. When the reaction time is still longer, zeolite X is formed. When the reaction time is between that necessary for the formation of zeolite A and that necessary for the formation of zeolite X, then a combination of zeolite A and zeolite X is formed. The reaction time is dependent upon the source of silica and whether or not the silica has been activated. The reaction time can be found readily by experimentation for any particular source of silica.

The reaction time necessary for crystallization at a given reaction temperature can be controlled in a variety of ways, but the major way of controlling reaction time is by adjusting the water to sodium oxide molar ratio of the reaction mixture. The reaction time necessary to form a zeolite is directly proportional to the water to sodium oxide molar ratio used. For instance, when the source of silica is not activated with alumina, the preferred water to sodium oxide molar for making zeolite A is between 15:1 and 20:1; for making zeolite X, it is between 30:1 and 60:1; and for making a combination of zeolite X and zeolite A it is between 25:1 and 35:1. One possible explanation is that a higher water to sodium oxide ratio means the solution is more dilute, which means that it takes longer for the reaction sites to come together, which causes a longer reaction time. Therefore, to get a zeolite A in a reaction mixture having a sodium oxide to silica molar ratio and a silica to alumina molar ratio where normally a zeolite X would be formed, one would decrease the water to sodium oxide ratio. Adjusting the water to sodium oxide molar ratio is the main control for determining which type of zeolite is formed and is analogous to a course control on a proportional feedback controller.

This relationship between the water to sodium oxide molar ratio and the type of zeolite formed was not previously known. For instance, U.S. Pat. Nos. 2,882,243 and 2,882,244, both of which issued to Robert Milton, show a water to sodium oxide molar ratio of from 35 to 200 for the production of zeolite A and a water to sodium oxide molar ratio of from 35 to 60 for the production of zeolite X. If anything, this would imply that the reaction mixture for preparing zeolite A should have a higher water to sodium oxide molar ratio than the reaction mixture for preparing zeolite X, which is not the case. In U.S. Pat. No. 3,119,659, the water to sodium oxide molar ratio for the production of zeolite A is from 20 to 100 while the water to sodium oxide molar ratio for the production of zeolite X is from 30 to 60. None of the above patents show that the water to sodium oxide molar ratio should be higher for making zeolite X than for making zeolite A.

Another way of controlling the reaction time necessary for crystallization at a given reaction temperature is by adjusting the sodium oxide to silica molar ratio of the reaction mixture. The reaction time necessary to form a zeolite is inversely proportional to the sodium oxide to silica molar ratio used. The effect of sodium oxide to silica molar ratio is less pronounced than that of water to sodium oxide molar ratio. It is analogous to a fine control on a proportional feedback controller.

One possible theory as to why increasing the sodium oxide to silica molar ratio would decrease the reaction time necessary to form a zeolite is that increasing the sodium oxide to silica molar ratio for a given water to sodium oxide molar ratio reduces the viscosity of the reaction mixture.

Adjusting the silica to alumina molar ratio of the reaction mixture also affects the reaction time necessary for crystallization at a given reaction temperature, but this effect is much less than the effect of sodium oxide to silica molar ratio, which in turn is much less than the effect of water to sodium oxide molar ratio. For a given water to sodium oxide molar ratio and a given sodium oxide to silica molar ratio, the reaction time necessary to form a zeolite is directly proportional to the silica to alumina molar ratio.

The reaction time at a given temperature can be reduced by adding the sodium aluminate solution to the sodium silicate solution at a fast rate of addition, preferably so that all of the sodium aluminate solution is added within 30 seconds, and more preferably simultaneously. Thus, the reaction time necessary for crystallization at a given reaction temperature can be increased by increasing the water to sodium oxide ratio; decreasing the sodium oxide to silica molar ratio; increasing the silica to alumina molar ratio and adding the two materials at a slow rate of addition.

When the reaction occurs longer than the reaction time necessary for crystallization, there is a tendency for zeolite A to convert to hydroxysodalite. Therefore, in the present process, the reaction mixture is reacted for a period of time longer than the reaction time necessary for crystallization.

DESCRIPTION OF THE PROCESS

In the present invention, a zeolite is formed by forming a sodium aluminate solution, forming a sodium silicate solution, adding together the sodium aluminate solution and the sodium silicate solution to produce a reaction mixture comprising a mother liquor and an amorphous sodium alumino silicate pigment, heating the mixture to a temperature of from 60 to 120 degrees Celsius, reacting the mixture at a temperature of from 60 to 120 degrees Celsius until the desired zeolite containing zeolite A is formed, reacting the zeolite A to produce a sodalite type product which reduces the chloride and carbonate ion level in the mother liquor, recovering the sodalite type product and desired zeolite from the mother liquor, and recycling the mother liquor to the reaction mixture.

The sodium silicate solution used in this process can be formed by dissolving sand in a sodium hydroxide solution at a pressure of at least 100 psig and a temperature of at least 130 degrees Celsius to produce a sodium silicate solution having a silica to sodium oxide molar ratio of between 2.4:1 and 2.8:1. The word "sand" is to be given its usual meaning of "a loose material consisting of small but easily distinguishable grains, usually less than two millimeters in diameter, most commonly of quartz resulting from the disintegration of rocks, and commonly used for making mortar and glass, as an abrasive, or for molds in founding." A temperature of at least 130 degrees Celsius is used to dissolve the sand because it is more difficult to dissolve sand at lower temperatures.

This sodium silicate solution is activated with from 50 to 2000 ppm alumina and heated to a temperature between 60 and 120 degrees Celsius. Alumina concentrations of less than 50 ppm alumina do not activate the silica. Alumina concentrations of more than 2000 ppm cause the alumina to precipitate out of the solution as an amorphous sodium alumino silicate. Preferably the silica to sodium oxide molar ratio of the sodium silicate solution is about 2.4:1, since this sodium silicate solution is usually less expensive to make than solutions having higher silica to sodium oxide molar ratios, such as waterglass.

After a sodium silicate solution is formed, and is either activated or not activated, a sodium aluminate solution is added to the sodium silicate solution to form a reaction mixture. The reaction mixture can also be formed by adding the sodium silicate solution to the sodium aluminate solution. Preferably both the sodium aluminate solution and the sodium silicate solution are heated to a temperature of between 60 and 120 degrees Celsius prior to the addition of the sodium aluminate to the sodium silicate to avoid agglomeration. More preferably, the solutions are heated to a temperature of 80 degrees Celsius. Preferably the two solutions are added simultaneously, or at least within thirty seconds, since fast addition times require less reaction time than longer addition times. Also there is the possibility of forming undesired zeolites if the addition time is too long.

Zeolite A can be formed in a reaction mixture having a water to sodium oxide molar ratio of between 10:1 and 35:1; a sodium oxide to silica molar ratio of between 1:1 and 4:1; and a silica to alumina molar ratio of between 2:1 and 10:1 wherein, when the sodium oxide to silica molar ratio is less than 4:3; the silica to alumina molar ratio is between 3:1 and 10:1, and when the sodium oxide to silica molar ratio is more than 4:3, the sodium oxide to alumina molar ratio is greater than 4:1.

As the water to sodium oxide molar ratio falls below 10:1, for the sodium oxide to silica and silica to alumina molar ratios of the present invention, there is an increased probability of forming hydroxy sodalite instead of zeolite A. As the water to sodium oxide molar ratio approaches 35:1, for the sodium oxide to silica and silica to alumina molar ratios of the present invention, there is an increased probability of producing either zeolite X or a combination of zeolite A and zeolite X instead of zeolite A.

As the sodium oxide to silica molar ratio approaches 1:1 the solution becomes extremely rich in silica, which has a dampening effect on the reaction. At sodium oxide to silica molar ratios of below 1:1, the reaction time needed to produce zeolite is prohibitively long. As the sodium oxide to silica molar ratio approaches 4:1, there is an increased probability of making hydroxy sodalite instead of zeolite A because of the sodium acting as an activator in the system.

As the silica to alumina molar ratio approaches 10:1 the yield decreases very rapidly. A silica to alumina molar ratio of at least 2:1 is required to supply enough silica to satisfy the stoichiometric formula for zeolite A and produce a sodium silicate mother liquor. Either a silica to alumina molar ratio of at least 3:1 or a sodium oxide to alumina molar ratio of at least 4:1 is required to achieve the small and uniform particle size of the present invention.

When the sodium silicate source has been activated with alumina, the preferred reaction mixture has a water to sodium oxide molar ratio of between 25:1 and 35:1; a sodium oxide to silica molar ratio of between 1.4:1 and 2:1; and a silica to alumina molar ratio of between 3:1 and 7:1. When the sodium silicate source has not been activated with alumina, the preferred reaction mixture has a water to sodium oxide molar ratio of between 15:1 and 20:1; a sodium oxide to silica molar ratio of between 1.5:1 and 2:1; and a silica to alumina molar ratio of between 2:1 and 4:1.

A combination of zeolite X and zeolite A can be formed in a reaction mixture having a water to sodium oxide molar ratio of between 10:1 and 60:1; a sodium oxide to silica molar ratio of between 0.5:1 and 3:1; and a silica to alumina molar ratio of between 2:1 and 15:1. When the sodium silicate source has been activated with alumina, the preferred reaction mixture has a water to sodium oxide molar ratio of between 15:1 and 60:1; a sodium oxide to silica molar ratio of between 0.7:1 and 1.7:1; and a silica to alumina molar ratio of between 5:1 and 10:1. When the sodium silicate source has not been activated with alumina, the preferred reaction has a water to sodium oxide molar ratio of between 20:1 and 50:1; a sodium oxide to silica molar ratio of between 1.4:1 and 3:1; and a silica to alumina molar ratio of between 2:1 and 10:1.

As the water to sodium oxide molar ratio falls below 10:1, for the sodium oxide to silica and silica to alumina molar ratios of the present invention, there is an increased probability of forming zeolite A instead of a combination of zeolite A and zeolite X. As the water to sodium oxide molar ratio approaches 60:1, for the sodium oxide to silica and silica to alumina molar ratios of the present invention, there is an increased probability of forming zeolite X instead of a combination of zeolite A and zeolite X.

As the sodium oxide to silica molar ratio approaches 0.5:1, the solution becomes so rich in silica that the reaction is completely dampened, with no reaction taking place within a reasonable time. As the sodium oxide to silica molar ratio approaches 3:1, there is an increased probability of making zeolite A instead of a combination of zeolite A and zeolite X because of the sodium acting as an activator in the system.

As the silica to alumina molar ratio approaches 15:1 the yield decreases rapidly. If the silica to alumina molar ratio is below 2:1, there is not enough silica in the process to fill the stoichiometric formula for zeolite X.

The reaction mixtures used in the present invention for producing zeolite X or zeolite A have higher silica to alumina molar ratios than the reaction mixtures used in the prior processes for producing the same zeolite. For instance, in the present invention the silica to alumina molar ratio of the reaction mixture used to make zeolite X is between 5:1 and 10:1. In U.S. Pat. No. 2,882,244 zeolite X is made from a reaction mixture having a silica to alumina molar ratio of from 3:1 to 5:1. In the present invention, zeolite A is preferably formed in a reaction mixture having a silica to alumina molar ratio of between 3:1 and 10:1. In U.S. Pat. No. 2,882,243 zeolite A is made from a reaction mixture having a silica to alumina molar ratio of from 0.5:1 to 2.5:1. Nothing in the prior art teaches that either zeolite X or zeolite A could be formed in a reaction mixture having such a high silica to alumina molar ratio as that of the present invention.

The reaction mixture is heated to a temperature of from 60 to 120 degrees Celsius and reacted at a temperature of from 60 to 120 degrees Celsius until a zeolite is formed, preferably at a temperature of from 80 to 100 degrees Celsius, most preferably at a temperature of about 80 degrees Celsius. Temperatures should be above 60 degrees Celsius to prevent agglomeration which would destroy the uniform size of the zeolite and insure that the zeolite A will be at least partly converted to a sodalite type product. This agglomeration occurs because of the higher viscosities of the solution at lower temperatures. Temperatures of above 120 degrees would require the use of high pressure, which would produce a different environment for the reaction, causing the formation of undesired products.

To ensure a good yield of the desired zeolite product, it is necessary to react the zeolite mixture beyond a certain minimum time. If, however, the reaction is continued too long, the product starts to lose silica, that is the silica to alumina ratio starts to fall, and if the reaction is continued even further, then the product may recrystallize to an undesirable zeolitic material. There is an optimum reaction time which is, in part, determined by the ratios and concentrations of the original reaction mixture, by the size of the batch, the time required to mix the ingredients and the rate of heating. The optimum reaction time can readily be determined by experiment.

Any process that produces zeolite A can be used to reduce the contaminant level of the mother liquor by converting some of that zeolite A to a sodalite type product.

The temperature to which the mother liquor is heated determines the amount of contaminants removed. The most significant change is between the temperatures of 120 and 140 degrees Celsius. For temperatures below 120 degrees Celsius there is little decrease in contaminant level. There is little additional change in contaminants removed for temperatures above 140 degrees Celsius.

Reaction times of one to two hours are sufficient for the reaction of zeolite A and the mother liquor to be complete. This reaction time is in addition to the reaction time needed to form zeolite A. Some contaminants will be removed at a reaction time as short as 30 minutes. Although the amount of contaminants removed increases as reaction time increases, the amount of contaminants removed in any unit of time decreases as the reaction time increases.

The sodalite type product formed is a combination of hydroxysodalite, sodalite, and natrodavyne. Hydroxysodalite is also known as zeolite HS. Typically, hydroxysodalite has a sodium oxide to alumina ratio of 1:1, a silica to sodium oxide ratio of 2:1, and a water to sodium oxide ratio of 2:1. Sodalite typically has a sodium oxide to alumina ratio of 4:3, a silica to sodium oxide ratio of 3:2, and an alumina to chloride ratio of 6:1. Natrodavyne is a sodium aluminum carbonate silicate. Natrodavyne typically has a formula of $3NaAlSiO_4 \cdot Na_2CO_3$.

While the applicant does not wish to be bound by any particular theory as to how this invention works, it is thought that the chloride and carbonate contaminants are removed from the mother liquor by incorporating those contaminants into the sodalite type product. The chloride contaminants are probably incorporated into sodalite, and the carbonate contaminants are probably incorporated into natrodavyne.

Once the zeolite has been separated from the mother liquor, the mother liquor is recycled as either a source of sodium and silica or sodium and aluminate, depending on the nature of the mother liquor. Recycling of the mother liquor eliminates the problem of how to dispose of the mother liquor.

ACTIVATION OF UNREACTIVE SOURCES OF SILICA

Any source of sodium silicate can be used in the present invention, but one particularly desirable source of sodium silicate is sand dissolved in caustic. The advantage of this source is its low cost. The sand is dissolved in a sodium hydroxide solution at a pressure of at least 100 psig and a temperature of at least 130 degrees Celsius to produce a sodium silicate solution having a silica to sodium oxide molar ratio of between 2.4:1 and 2.8:1. Preferably the pressure is about 140 psig, producing a sodium silicate solution having a silica to sodium oxide molar ratio of about 2.4:1.

The time required to produce a given product from batches of identical chemical composition will be dependent of the source of silicon dioxide. Each different type of silica source has its own time table specifying the reaction times needed to form each type of zeolite. One of the discoveries upon which this invention is based is the fact this time table can be changed by activating the silica source with alumina.

The silica source can be activated with from 50 to 2000 ppm alumina at a temperature of from 15 to 100 degrees Celsius for at least 10 minutes. The alumina concentration limits of 50 to 2000 ppm alumina are critical values. For some reason, alumina concentrations below 50 ppm fails to activate the sodium silicate solution. Preferably, the alumina concentration is between 400 and 600 ppm, most preferably 600 ppm. Preferably the activation occurs at room temperature.

The alumina used to activate the sodium silicate solution may suitably be provided by a soluble aluminum compound such as sodium aluminate or a water soluble aluminum salt, such as aluminum sulphate. Sodium aluminate is, however, the preferred reagent since it limits the tendency to introduce foreign ions into the zeolite lattice.

There is an important difference between the effect of activation and the effect of reaction time controlling factors such as water to sodium oxide molar ratio, sodium oxide to silica molar ratio, silica to alumina molar ratio and rate of addition. The reaction time controlling factors are used to adjust the reaction time necessary for crystallization so that it will match with the reaction time in a time table to produce a particular zeolite. Activation changes the time table. For that reason, the preferred oxide mole ratios for producing a desired zeolite are different when a source of silica is either activated or not activated.

EXAMPLES

The invention will be further illustrated by the following examples which set forth particularly advantageous methods and composition embodiments. While the examples illustrate the present invention, they are not intended to limit it.

CONTROL OF SODALITE FORMATION

Not all of the following examples are examples of the present invention, but they all show the theory behind the present invention. Examples 1, 4, 5, 6, 10, 16, 17, 22, 23, 24 and 25 are all control examples. All other examples are examples of the present invention.

Examples 1 through 24 show how to control the amount of sodalite formed. In each example, a sodium aluminate solution and a sodium silicate solution are formed; the two solutions are added together to produce a certain mixture comprising a mother liquor and an amorphous sodium aluminosilicate; the reaction mixture is reacted to form a zeolite A and the reaction mixture is further reacted to convert some of the zeolite A to a sodalite type product.

Examples 1 through 6 show the effect of water to sodium oxide molar ratio on sodalite formation. The process conditions and amount of sodalite formed for each example is shown in Table I. (The phrase "XRD %H.S." in the tables stands for % of sodalite type product by x-ray difraction data.)

TABLE I

| EFFECT OF WATER TO SODIUM OXIDE MOLAR RATIO | | | | | | |
|---|---|---|---|---|---|---|
| Example | Water/ Sodium Oxide | Sodium Oxide/ Silica | Silica/ Alumina | Temp. degrees C. | Time Hrs. | XRD % H.S. |
| 1 | 15 | 1.6 | 2.0 | 100 | 0.5 | 0 |
| 2 | 15 | 1.6 | 2.0 | 100 | 1.0 | 10 |
| 3 | 15 | 1.6 | 2.0 | 100 | 1.5 | 27 |
| 4 | 25 | 1.6 | 2.0 | 100 | 0.5 | 0 |
| 5 | 25 | 1.6 | 2.0 | 100 | 1.0 | 0 |
| 6 | 25 | 1.6 | 2.0 | 100 | 1.5 | 0 |

Thus, the amount of sodalite type product produced can be controlled by adjusting either the reaction time or the water to sodium oxide molar ratio. The amount of sodalite type product can be increased by either increasing the reaction time or decreasing the water to sodium oxide molar ratio. Conversely, the amount of sodalite type product can be decreased by either decreasing the reaction time or increasing the water to sodium oxide molar ratio.

Examples 7 through 12 show the effect of sodium oxide to silica molar ratio on sodalite formation. The process conditions and amount of sodalite formation for each example is shown in Table II.

TABLE II

| EFFECT OF SODIUM OXIDE TO SILICA MOLAR RATIO | | | | | | |
|---|---|---|---|---|---|---|
| Example | Water/ Sodium Oxide | Sodium Oxide/ Silica | Silica/ Alumina | Temp. degrees C. | Time Hrs. | XRD % H.S. |
| 7 | 20 | 2.4 | 2.0 | 100 | 0.5 | 4 |

TABLE II-continued

EFFECT OF SODIUM OXIDE TO SILICA MOLAR RATIO

| Example | Water/ Sodium Oxide | Sodium Oxide/ Silica | Silica/ Alumina | Temp. degrees C. | Time Hrs. | XRD % H.S. |
|---|---|---|---|---|---|---|
| 8 | 20 | 2.4 | 2.0 | 100 | 1.0 | 9 |
| 9 | 20 | 2.4 | 2.0 | 100 | 1.5 | 15 |
| 10 | 20 | 1.6 | 2.0 | 100 | 0.5 | 0 |
| 11 | 20 | 1.6 | 2.0 | 100 | 1.0 | 2 |
| 12 | 20 | 1.6 | 2.0 | 100 | 1.5 | 2 |

Thus, the amount of sodalite type product produced can be controlled by adjusting either the reaction time or the sodium oxide to silica molar ratio. The amount of sodalite type product can be increased by increasing either the reaction time or the sodium oxide to silica ratio. Conversely, the amount of sodalite type product can be decreased by decreasing either the reaction time or the sodium oxide to silica ratio.

Examples 13 through 18 show the effect of silica to alumina molar ratio on sodalite formation. The process conditions and amount of sodalite formation for each example is shown in Table III

TABLE III

EFFECT OF SILICA TO ALUMINA MOLAR RATIO

| Example | Water/ Sodium Oxide | Sodium Oxide/ Silica | Silica/ Alumina | Temp. degrees C. | Time Hrs. | XRD % H.S. |
|---|---|---|---|---|---|---|
| 13 | 20 | 2.0 | 2.0 | 100 | 0.5 | 3 |
| 14 | 20 | 2.0 | 2.0 | 100 | 1.0 | 5 |
| 15 | 20 | 2.0 | 2.0 | 100 | 1.5 | 8 |
| 16 | 20 | 2.0 | 3.0 | 100 | 0.5 | 0 |
| 17 | 20 | 2.0 | 3.0 | 100 | 1.0 | 0 |
| 18 | 20 | 2.0 | 3.0 | 100 | 1.5 | 4 |

Thus, the amount of sodalite type product produced can be controlled by adjusting either the reaction time or the silica to alumina molar ratio. The amount of sodalite type product can be increased by either increasing the reaction time or changing the silica to alumina ratio to depart from the ratio of 2:1. Conversely, the amount of sodalite type product can be decreased by decreasing the reaction time or changing the silica to alumina ratio to approach a ratio of 2:1.

Examples 19 through 24 show the effect of reaction temperature on sodalite formation. The process conditions and amount of sodalite formation for each example is shown in Table IV.

TABLE IV

EFFECT OF REACTION TEMPERATURE

| Example | Water/ Sodium Oxide | Sodium Oxide/ Silica | Silica/ Alumina | Temp. degrees C. | Time Hrs. | XRD % H.S. |
|---|---|---|---|---|---|---|
| 19 | 20 | 2.4 | 2.0 | 100 | 0.5 | 4 |
| 20 | 20 | 2.4 | 2.0 | 100 | 1.0 | 9 |
| 21 | 20 | 2.4 | 2.0 | 100 | 1.5 | 15 |
| 22 | 20 | 2.4 | 2.0 | 80 | 0.5 | 0 |
| 23 | 20 | 2.4 | 2.0 | 80 | 1.0 | 0 |
| 24 | 20 | 2.4 | 2.0 | 80 | 1.5 | 0 |

Thus, the amount of sodalite type product produced can be controlled by adjusting either the reaction time or temperature. The amount of sodalite type product can be increased by increasing either the reaction time or temperature. Conversely, the amount of sodalite type product can be decreased by decreasing either the reaction time or temperature.

EFFECT OF SODALITE FORMATION ON CONTAMINANT REMOVAL

The chloride ion concentration was measured by using an Orion Combination Chloride Electrode Orion Model 96-17. The chloride ion is precipitated by the addition of silver nitrate as silver chloride. The equivalence point is determined by the use of Gran's Plot Paper. This paper is corrected for 10% dilution and is an anti-semilog type paper. The Nerstian behavior of the electrode past the equivalence point allows the equivalence point to be determined by extrapolation. The error in this test is ±5-10 ppm.

The carbonate ion concentration was measured by using the carbonic acid/carbonate equilibrium's response to changes in pH as a specific electrode for the carbonate ion. An Orion carbon dioxide gas permeable membrane electrode is used. The test error is ±0.06% carbonate.

Examples 25 through 30 show the effect of sodalite formation on contaminant removal. The process conditions, amount of sodalite formed, and amount of contaminants in mother liquor is shown in Table V. All runs were made at a water to sodium oxide molar ratio of 30, a sodium oxide to silica molar ratio of 1.7, a silica to alumina molar ratio of 1.5, and a reaction temperature of 100 degrees Celsius.

TABLE V

EFFECT OF SODALITE FORMATION ON LEVEL OF CONTAMINANTS

| Example | Reaction Time, hr. | XRD % H.S. | Mother Liquor % Sodium Carbonate | ppm Sodium Chloride |
|---|---|---|---|---|
| 25 | 0 | 0 | 1.01 | 1027 |
| 26 | 2 | 6 | 0.87 | 996 |
| 27 | 3 | 8 | 0.91 | 975 |
| 28 | 4 | 8 | 0.90 | 942 |
| 29 | 5 | 10 | 0.85 | 920 |
| 30 | 6 | 12 | 0.76 | 901 |

Thus, in operation, increased sodalite formulation reduces the level of contaminants in a mother liquor.

While the present invention has been described with reference to specific embodiments, this application is intended to cover those various changes and substitutions which may be made by those skilled in the art without departing from the spirit and scope of the appended claims.

I claim:

1. In a process of producing zeolite A by the steps of mixing a sodium aluminate solution and a sodium silicate solution to produce a reaction mixture comprising a mother liquor containing chloride and carbonate contaminants and an amorphous sodium aluminosilicate; continuing said reaction to form a zeolite composition containing zeolite A; recovering said zeolite A composition from said reaction mixture; and recycling said mother liquor to said reaction mixture;

the improvement comprising: heating said zeolite A while contained in said reaction mixture at a temperature of 120° to 140° C. for a sufficient time to convert a sufficient portion of the zeolite A to a sodalite type product which reduces the chloride and carbonate ion levels in said mother liquor by forming compounds containing these ions; and recovering said sodalite type product from said reaction mixture as part of the zeolite composition prior to recycling said mother liquor.

* * * * *